United States Patent
Wada

[11] Patent Number: 5,164,829
[45] Date of Patent: Nov. 17, 1992

[54] SCANNING VELOCITY MODULATION TYPE ENHANCEMENT RESPONSIVE TO BOTH CONTRAST AND SHARPNESS CONTROLS

[75] Inventor: Michio Wada, Osaka, Japan

[73] Assignee: Matsushita Electric Industrial Co., Ltd., Osaka, Japan

[21] Appl. No.: 709,871

[22] Filed: Jun. 4, 1991

[30] Foreign Application Priority Data

Jun. 5, 1990 [JP] Japan .................. 2-148287

[51] Int. Cl.⁵ .......................... H04N 5/208
[52] U.S. Cl. ...................... 358/162; 358/166
[58] Field of Search ............ 358/166, 37, 162, 168, 358/169, 242

[56] References Cited

U.S. PATENT DOCUMENTS

| 4,080,628 | 3/1978 | Jirka | 358/242 |
| 5,072,300 | 10/1991 | Anderson | 358/166 |

FOREIGN PATENT DOCUMENTS 61-210769 9/1986 Japan .
2-30276 1/1990 Japan .
2-249366 10/1990 Japan .

Primary Examiner—James J. Groody
Assistant Examiner—Mark R. Powell
Attorney, Agent, or Firm—Pollock, VandeSande & Priddy

[57] ABSTRACT

An outline compensation apparatus for a television receiver includes a circuit for detecting outlines of regions of a picture, expressed in a video signal, and a velocity modulation circuit for effecting outline enhancement in response to an output signal produced from the outline detection circuit. The amplitude of that output signal is controlled in accordance with both a contrast adjustment signal and a sharpness adjustment signal that are used to process the video signal in order to modify the degrees of contrast and sharpness of definition of the picture, respectively. The operation of the outline compensation apparatus is thereby made to effectively complement any increase or decrease of display contrast and sharpness that results from the application of the contrast adjustment signal and sharpness adjustment signal, enabling the user to more easily adjust the television receiver to obtain a clear and natural-looking displayed picture.

3 Claims, 1 Drawing Sheet

SCANNING VELOCITY MODULATION TYPE ENHANCEMENT RESPONSIVE TO BOTH CONTRAST AND SHARPNESS CONTROLS

BACKGROUND OF THE INVENTION

1. Field of the Invention

The present invention relates to an outline compensation apparatus for providing a controlled degree of enhancement of boundaries between regions of differing brightness in a picture displayed by a television receiver.

2. Description of Related Art

Recently developed types of television receivers having a large-screen display are generally provided with circuits for effecting a controlled degree of enhancement of the boundaries between adjacent regions which are of mutually different brightness. Such circuits of a television receiver will be collectively referred to in the following as an outline compensation apparatus. In the case of a television receiver having a cathode ray tube (hereinafter referred to as CRT) display, outline enhancement is usually executed by a velocity modulation circuit, which varies the horizontal scanning velocity of the electron beam of the CRT such as to make the transitions between different regions of the displayed picture become more abrupt, to thereby apply compensation for various signal processing effects which tend to cause the transitions to become gradual. Such outline enhancement (sometimes referred to as "edge enhancement") results in an apparent increase in sharpness of definition of these boundaries, as seen by the viewer. To control such a velocity modulation circuit, it is necessary to detect the outlines, i.e. boundaries between regions of different brightness, by detecting sudden changes in amplitude of the luminance signal component of the television signal. This is usually achieved by amplifying and then differentiating the luminance signal, at the point in the television signal path where the chroma signal and luminance signal are separated from the composite video signal (e.g. by means of a comb filter). In parallel with that outline detection processing, the luminance signal is subjected to various processing to modify the level of contrast and degree of sharpness of definition of the picture, before being finally applied to drive the cathode of the CRT. Thus, the luminance signal that is used for the purposes of outline detection is essentially different from the luminance signal which is applied to the cathode of the CRT.

As a result, with such a prior art outline compensation apparatus, if for example the user adjusts the picture contrast control such as to lower the degree of contrast, then there will be a resultant change in the luminance signal that is applied to the cathode of the CRT, but there will be no change in the luminance signal that is supplied to the outline detection circuit. Hence the outline compensation apparatus will continue to apply the same amount of outline enhancement. Since a relatively high degree of outline enhancement contributes to an increased degree of (visually perceived) display contrast, the operation of the outline compensation apparatus in that case will act to reduce the effectiveness of the reduction of contrast by the user. Similarly, if the user adjusts the picture sharpness control (i.e. to thereby adjust the level of certain high-frequency components of the luminance signal that is applied to the cathode of the CRT, thereby varying the sharpness of definition of detail in the displayed picture) such as to lower the degree of sharpness of definition, there will be no change in the luminance signal that is supplied to the outline detection circuit. Hence the outline compensation apparatus will continue to apply the same amount of outline enhancement. Since a relatively high degree of outline enhancement contributes to an increased degree of (visually perceived) overall sharpness of definition in the displayed picture, the operation of the outline compensation apparatus in that case will again act to reduce the effectiveness of the reduction of contrast that is desired by the user.

Thus, when the user attempts to adjust the contrast and/or sharpness of the displayed picture in order to provide a more natural-appearing picture, the effectiveness of such adjustment of the picture quality will be reduced due to the operation of the outline compensation apparatus.

It would be possible to overcome this problem by inputting to the outline detection circuit of the outline compensation apparatus the luminance signal after that signal has been subjected to contrast adjustment and sharpness adjustment. However in that case the input signal to the outline detection circuit will be at a position (i.e. along the circuit path extending from the point of separation of the chroma and luminance signals to the point of connection to the CRT cathode) that is very close to the CRT. Hence the delay time between the time at which the outline compensation apparatus receives the luminance signal and the time at which the signal reaches the cathode of the CRT will be very short. It therefore becomes necessary to carefully match the phase of the waveform of the drive current in the velocity modulation coil to the waveform of the signal that is applied to the CRT cathode. Such phase matching will be required for both luminance and chroma components, and will result in increased manufacturing cost, due to the need to incorporate suitable delay elements.

SUMMARY OF THE INVENTION

It is an objective of the present invention to overcome the above problems by providing an outline compensation apparatus for use in a television receiver, whereby a degree of outline enhancement that is effected by the apparatus will be varied in accordance with either or both of a degree of picture contrast adjustment and a degree of picture sharpness adjustment that is applied by the user, thereby providing the user with more effective control over the appearance of a displayed picture, and whereby the problems can be overcome by using simple circuit means which will not significantly increase the manufacturing cost of the television receiver.

To achieve the above objective, the present invention provides an outline compensation apparatus which functions such that an amount of outline enhancement that is effected by the apparatus is modified in accordance with either or both of the level of a contrast adjustment signal, which can be varied by the user to determine a degree of contrast in a displayed picture, and the level of a sharpness adjustment signal, which can be varied by the user to determine a degree of sharpness of definition in the displayed picture.

More specifically, the levels of the contrast adjustment signal and the sharpness adjustment signal will in general be respective DC voltage levels, and these are combined to obtain a limiter control voltage that is applied to an amplitude limiter circuit. The amplitude limiter circuit acts to limit the amplitude of an input signal that is supplied to a velocity modulation circuit from an outline detection circuit, with the amplitude limit value being varied in accordance with the limiter control voltage.

As a result, when for example either or both of the picture contrast and the picture sharpness are made high, then the degree of outline enhancement will be made correspondingly high, and conversely, when either or both of the picture contrast and the picture sharpness are made low, the degree of outline enhancement will be made correspondingly low. In that way, more effective control of the appearance of the displayed picture is provided to the user.

DESCRIPTION OF PREFERRED EMBODIMENTS

Figure 1:
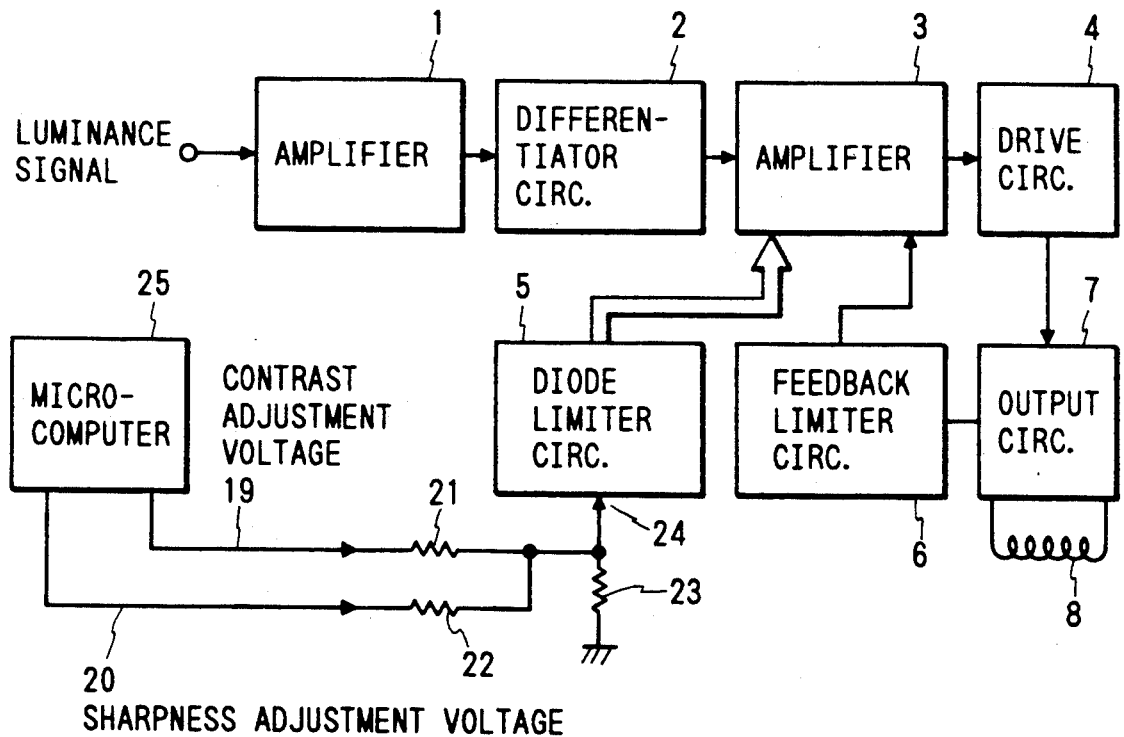
FIG. 1 is a general circuit block diagram of an embodiment of an outline compensation apparatus according to the present invention.

FIG. 1 is a general circuit block diagram of an embodiment of an outline compensation apparatus according to the present invention, in which an input luminance signal (which has been derived in a television receiver circuit, not shown in the drawings, and has not yet been subjected to contrast adjustment or sharpness adjustment processing) is amplified by an amplifier circuit 1, then is inputted to a differentiator circuit 2 to be differentiated, for thereby detecting points in the luminance signal which correspond to outlines in the picture that is represented by that signal. The output signal resulting from this detection is then amplified by an amplifier circuit 3, then is inputted to a drive circuit 4, to be supplied to a output circuit 7 which drives a velocity modulation coil 8. The velocity modulation coil 8 is located on the CRT, and is positioned for applying velocity modulation to the electron beam along the horizontal scanning direction, in accordance with an amplitude of drive current that is produced from the output circuit 7, such as to produce outline enhancement of a picture displayed by the CRT. The level of current flow in the velocity modulation coil 8 is detected and a signal indicative of that level is transferred through a feedback limiter circuit 6 back to the amplifier circuit 3, for limiting the maximum amplitude of velocity modulation that is applied by to the electron beam. In addition, that amplitude of velocity modulation is limited (within a range of amplitudes which is lower than a level of amplitude at which limiting action by feedback from the feedback limiter circuit 6 begins) by a diode limiter circuit 5 which is coupled to a point in the circuit path of the luminance signal after the input terminal of the amplifier circuit 3, e.g. to the output terminal of the amplifier circuit 3. The actual value of amplitude to which the output signal from the amplifier circuit 3 is limited by the action of the diode limiter circuit 5, at any particular time, is determined by the level of a limit control signal 24 which is applied to the diode limiter circuit 5.

The amplifier circuit 1, differentiator circuit 2 and amplifier 3 will be considered to constitute, in combination, an outline detection circuit, while the drive circuit 4, output circuit 7 and coil 8 will be considered to constitute, in combination, a velocity modulation circuit.

Figure 2:
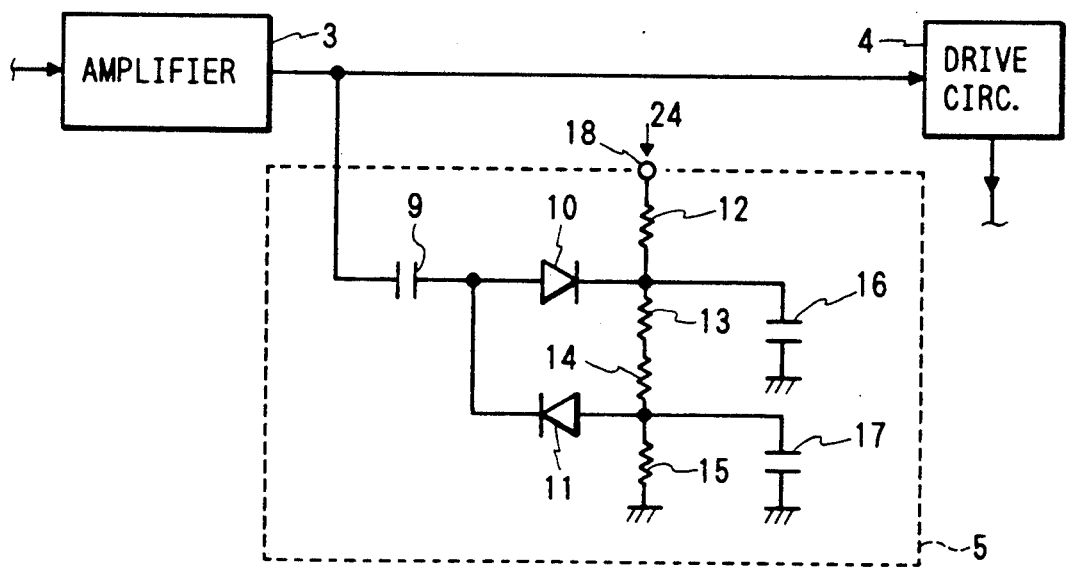
FIG. 2 is a circuit diagram showing details of a diode limiter circuit in the circuit of FIG. 1.

FIG. 2 shows an example of a detailed circuit configuration for the diode limiter circuit 5 of FIG. 1. In FIG. 2, a the output signal from the amplifier circuit 3 is transferred through a capacitor 9 to the junction of two diodes 10, 11, with a chain of resistors 12, 13, 14, 15 being connected between an input terminal 18 and ground potential and with the cathode of one of the diodes 10, 11 being connected to the junction of the resistors 12, 13 and the anode of the other one of the diodes being connected to the junction of resistors 14 and 15. The junctions of resistors 12, 13 and 14, 15 are connected via respective capacitors 16, 17 to ground potential.

The circuit of FIG. 2 would be equally applicable to a prior art outline compensation apparatus, in which the output signal amplitude from the amplifier circuit 3 is limited to a fixed value. That is to say, in such a prior art outline compensation apparatus, the input terminal 18 of the diode limiter circuit 5 would be fixedly connected to a DC voltage which determines the amplitude limit value, i.e. with the upper limit of the output signal voltage amplitude from the amplifier circuit 3 being substantially equal to the voltage appearing at the junction of the resistors 12, 13 and the lower limit of that output signal voltage amplitude being substantially equal to the voltage appearing at the junction of the resistors 14, 15. The value of each of the capacitors 16 and 17 is made sufficiently high to ensure that effective limiting of the amplitude of the differentiated output voltage pulses produced from the amplifier circuit 3 will occur, when that differentiated voltage amplitude becomes higher than the upper limit value or becomes lower than the lower limit value. Thus in the prior art, the waveform of the output signal from the amplifier circuit 3 is held at a substantially constant amplitude.

However with the present invention, the voltage 24 that is applied to the input terminal 18 in FIG. 2 is varied in accordance with a combination of the degree of contrast adjustment and the degree of sharpness adjustment that is currently being applied to the luminance signal prior to that signal being supplied to the cathode of the CRT. Specifically, a contrast adjustment voltage 19 and a sharpness adjustment voltage 20 are generated within the television receiver circuit, which are applied through respective resistors 21 and 22 to a junction of these resistors with a third resistor 23 which is connected to ground potential. The aforementioned limit control voltage 24 is thereby produced at that junction. The respective levels of the contrast adjustment voltage 19 and the sharpness adjustment voltage 20 are varied under the control of the user, i.e. by operating external control devices of the television receiver, to generate corresponding input signals which in this embodiment are assumed to be supplied to a microcomputer 25. The microcomputer 25 determines optimum values for the contrast adjustment voltage 19 and sharpness adjustment voltage 20 respectively, in accordance with these input signals generated by the user, such as to maintain satisfactory picture quality while effecting desired changes in picture contrast and/or sharpness of definition. That is to say, the contrast adjustment voltage 19 and sharpness adjustment voltage 20 are applied (by circuits not shown in the drawings) to modify the luminance signal prior to applying that signal to the cathode of the CRT.

The respective contributions of the contrast adjustment voltage 19 and sharpness adjustment voltage 20 to the value of the limit control voltage 24 will be determined by the respective values of the resistor 21 and 22. These respective resistor values are selected such as to provide an optimum degree of natural appearance in the final displayed picture throughout various different conditions of contrast and sharpness of that picture, resulting from various different values of the contrast adjustment voltage 19 and sharpness adjustment voltage 20. For example, if the value of the resistor 21 is made smaller than that of the resistor 22, then greater changes will occur in the limit value of amplitude (determined by the diode limiter circuit 5) in response to changes in the contrast adjustment voltage 19 than will occur in response to changes in the sharpness adjustment voltage 20. Thus the respective values of these resistors can be determined such as to ensure that a clear and natural-looking picture will be displayed at all times.

As described above, an outline compensation apparatus controls a degree of outline enhancement of a displayed picture of a television receiver in accordance with one or both of the levels of a contrast adjustment signal voltage and a sharpness adjustment signal voltage. This effectively overcomes the problem which is encountered with a prior art type of outline compensation apparatus in which the degree of outline enhancement is fixed, so that the operation of the outline compensation apparatus may tend to counteract a desired reduction of display contrast and/or sharpness of definition, or may not provide a sufficiently high degree of outline enhancement when the user wishes to increase the display contrast and/or sharpness of definition. The invention thus is highly effective in enabling the user of a television receiver to adjust the characteristics of a displayed picture such as to produce a clear and natural-looking picture.

In the above description of the preferred embodiment, it is assumed that the limit control voltage 24 in FIG. 2 is generated based on a combination of the contrast adjustment voltage 19 and the sharpness adjustment voltage 20. However it would also be possible to utilize only one of these to derive that limit control voltage 24.

Furthermore although the preferred embodiment has been described for the case of velocity modulation based on electromagnetic deflection force applied to the electron beam of a CRT by the velocity modulation coil 8, it would be equally possible to apply the invention to velocity modulation which is based on electrostatic deflection.

Moreover the invention is not limited to an outline compensation apparatus which is based on outline enhancement by means of velocity modulation of an electron beam of a CRT display, but could be adapted for use with a television receiver having some other type of display device such as a liquid crystal display panel, by using an appropriate method of outline enhancement.

What is claimed is:

1. An outline compensation apparatus for use in a television receiver, comprising:
   outline detection circuit means for detecting outlines in a picture represented by a television video signal;
   outline enhancement means for enhancing said outlines; and
   control means coupled to receive a contrast adjustment signal which is utilized to modify said video signal such as to adjust a degree of contrast of said picture, and a sharpness adjustment signal which is utilized to modify said video signal such as to adjust a degree of sharpness of definition of said picture, said control means being responsive to said contrast adjustment signal and sharpness adjustment signal in combination for varying a degree of outline enhancement that is effected by said outline enhancement means.

2. An outline compensation apparatus according to claim 1, wherein said picture is displayed by a cathode ray tube of said television receiver, and wherein said outline enhancement means comprises a velocity modulation circuit for effecting modulation of a scanning velocity of an electron beam of said cathode ray tube.

3. An outline compensation apparatus according to claim 2, wherein said outline enhancement means is responsive to an increase of at least one of said degree of contrast adjustment and said degree of sharpness adjustment, for producing an increased amplitude of velocity modulation by said velocity modulation means.

* * * * *